(12) United States Patent
Svatek et al.

(10) Patent No.: US 7,905,357 B2
(45) Date of Patent: Mar. 15, 2011

(54) PRODUCT FLOW CONTROL APPARATUS FOR SORTING

(75) Inventors: Dale Adolph Svatek, Needville, TX (US); Patric Carey Pike, Hopkins, MI (US); Simon John Hills, Longnor (GB)

(73) Assignee: Satake USA, Inc., Stafford, TX (US)

( * ) Notice: Subject to any disclaimer, the term of this patent is extended or adjusted under 35 U.S.C. 154(b) by 489 days.

(21) Appl. No.: 12/031,815

(22) Filed: Feb. 15, 2008

(65) Prior Publication Data

US 2008/0290003 A1 Nov. 27, 2008

Related U.S. Application Data

(60) Provisional application No. 60/890,049, filed on Feb. 15, 2007.

(51) Int. Cl.
*B07C 5/02* (2006.01)
(52) U.S. Cl. .................. 209/246; 209/911
(58) Field of Classification Search ............... 209/246, 209/248, 499, 908, 911
See application file for complete search history.

(56) References Cited

U.S. PATENT DOCUMENTS

| | | | |
|---|---|---|---|
| 1,732,463 A | 10/1929 | Fegles | |
| 2,210,505 A | 8/1940 | Sinden | |
| 2,282,718 A | 5/1942 | Fujioka | |
| 3,446,349 A * | 5/1969 | Benzon | 209/17 |
| 4,410,091 A | 10/1983 | Cowlin et al. | |
| 4,411,778 A | 10/1983 | Venable | |
| 4,602,716 A | 7/1986 | Barla-Szabo et al. | |
| 4,710,296 A * | 12/1987 | Connolly | 210/420 |
| 4,940,850 A | 7/1990 | Satake | |
| 4,981,587 A * | 1/1991 | Moorhead | 210/402 |
| 5,245,188 A * | 9/1993 | Satake et al. | 250/341.7 |
| 5,740,901 A | 4/1998 | Lazzirotti et al. | |
| 6,884,956 B2 | 4/2005 | Murata et al. | |
| 2006/0025884 A1 | 2/2006 | Henkel | |

OTHER PUBLICATIONS

Young, Lee, International Search Report—PCT/US08/54062, Jul. 14, 2008, 2 pages, United States Patent and Trademark Office as International Search Authority, Alexandria, Virginia, US.
Young, Lee, Written Opinion of the International Search Authority—PCT/US08/54062, Jul. 14, 2008, 6 pages, United States Patent and Trademark Office as International Search Authority, Alexandria, Virginia, US.
Dunn, Thomas, International Preliminary Report on Patentabilioty—PCT/US08/54062, Aug. 7, 2009, 5 pages, United States Patent and Trademark Office as International Search Authority, Alexandria, Virginia, US.

* cited by examiner

*Primary Examiner* — Joseph C Rodriguez
(74) *Attorney, Agent, or Firm* — James E. Hudson, III; Crain, Caton & James, P.C.

(57) ABSTRACT

A product flow control apparatus for use in sorting of products, and particularly relatively small products. The apparatus includes a reservoir of products to be sorted, a flow-rate control passage at which a flow restrictor limits the flow rate of products passing to a slide before imaging by a product viewer and sorting by ejector. A flow valve operates to provide products to a flow-rate control passage at a flow rate at which the product viewer and the ejector can operate.

3 Claims, 4 Drawing Sheets

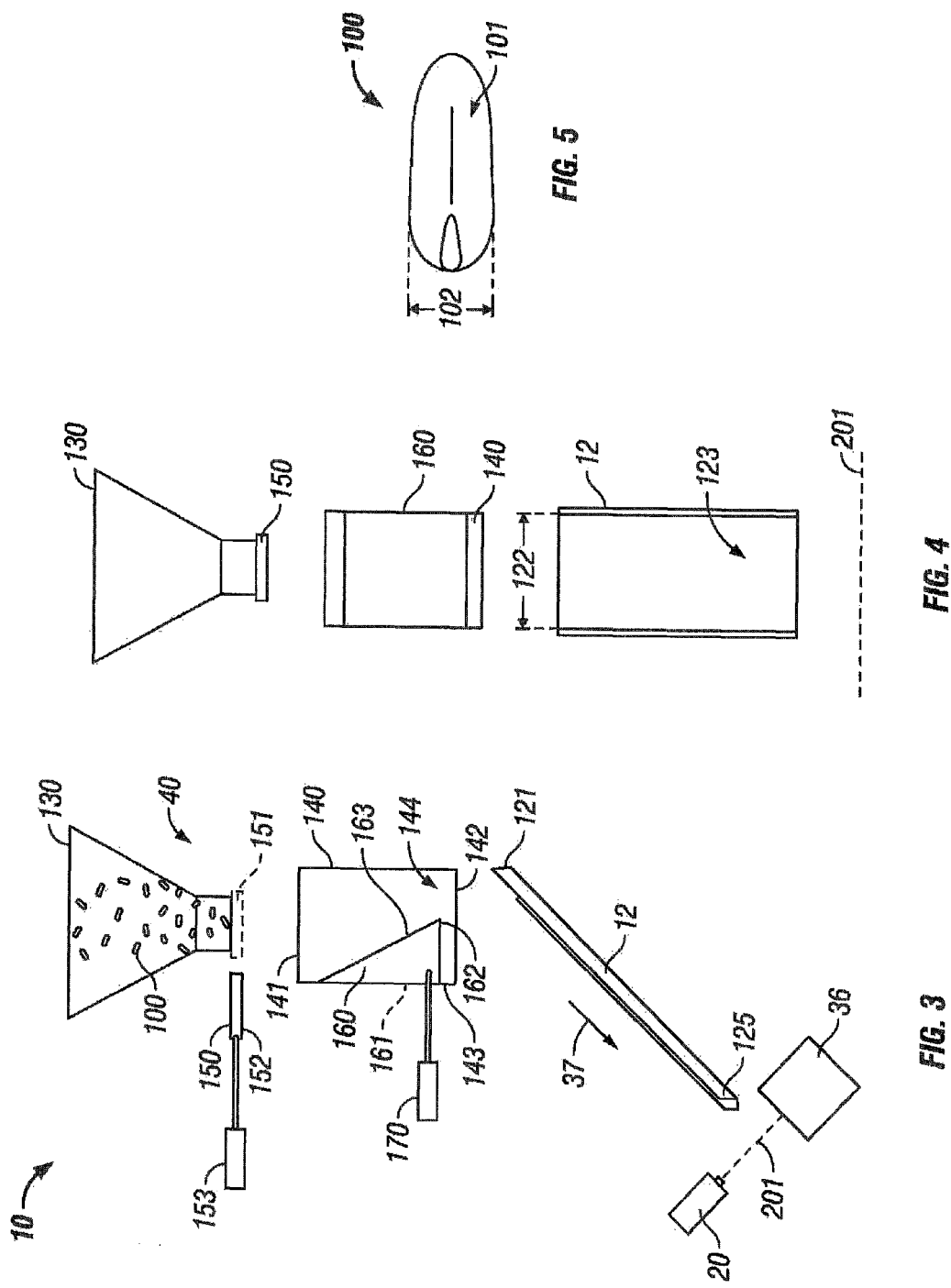

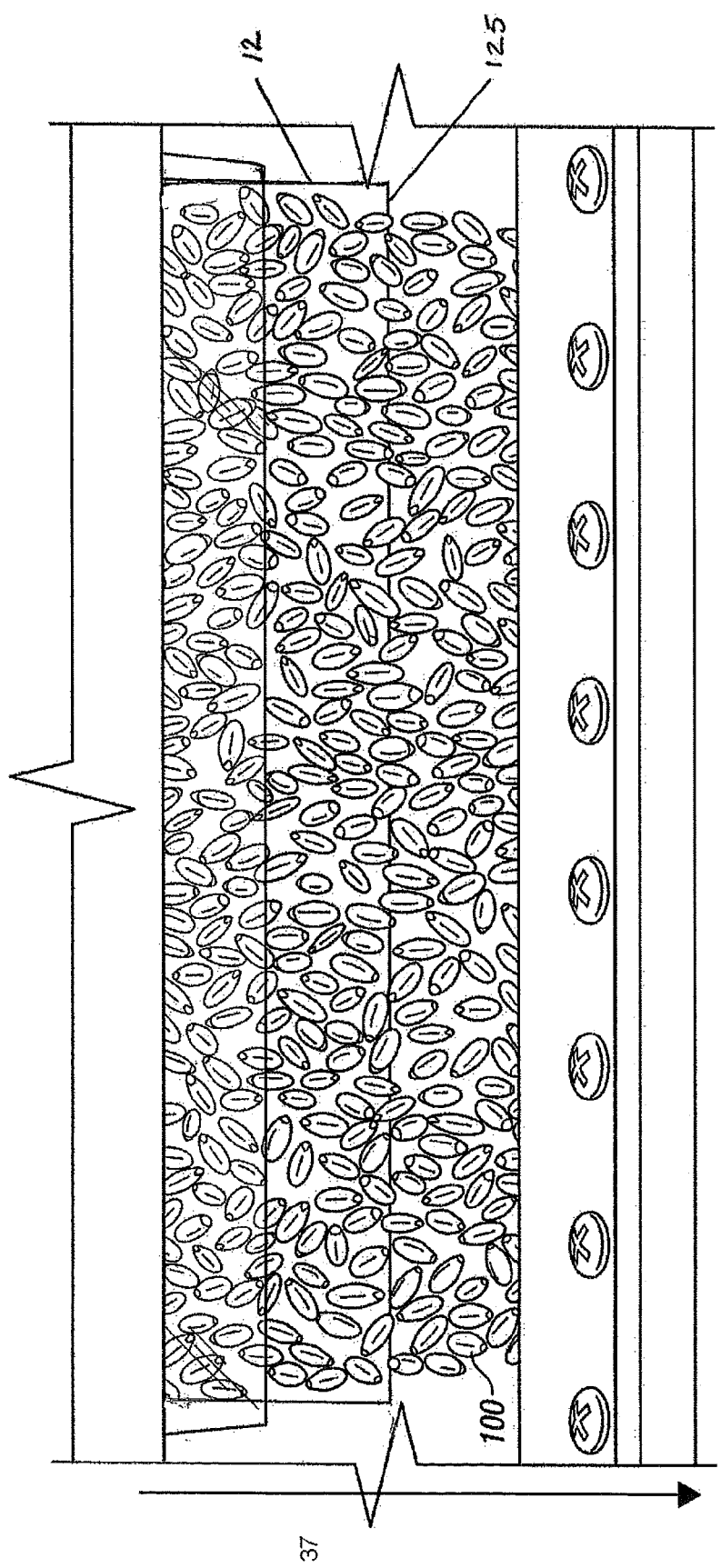

PRODUCT FLOW CONTROL APPARATUS FOR SORTING

CROSS REFERENCE TO RELATED APPLICATIONS

This application claims the benefit of U.S. Provisional Patent Application No. 60/890,049 entitled, "High speed volumetric flow control apparatus for sorting" filed on Feb. 15, 2007 in the United States Patent and Trademark Office.

STATEMENT REGARDING FEDERALLY SPONSORED RESEARCH OR DEVELOPMENT

Not applicable.

BACKGROUND OF THE INVENTION

1. Field of Invention

The present invention relates to product delivery systems particularly suited for in gravitationally-fed sorters of transversely-spaced products moving along a direction of travel, which sorters separate transversely spaced products according to differences in their characteristics. In particular, the invention relates to a product flow control apparatus controlling the flow rate of products to be sorted, flowing at high rates induced by gravity which may be used in connection with relatively small, granular products to increase product density through the sorting machine and to increase sorting efficiency.

2. Description of the Related Art

A typical sorting machine of the type envisioned for application of the present invention is a gravity-fed high-speed sorting machine used for sorting small products, including fungible products in the food and pharmaceutical industries. For example, individual rice grains may be sorted to separate grains selected as "substandard." In the art, "substandard" may apply to a grain having any undesirable characteristic, including color, shape, size or breakage, or any other characteristic not within the limits for acceptable products for a particular sorting. As used, product refers generally to the entirety of the item to be sorted, but may also be used to refer to an individual item.

Such a sorter incorporates a slide or chute at a steep angle having one or more channels across its width. A hopper or other feed system is positioned to dispense its product on the top of the slide. Gravity slide sorters have been in use for many years, sorting a wide variety of food products and many non-food products as well. Early sorters were single channel units, with a flat, "J," "U"-, or "V"-shaped slide conveying product to a viewing area. Later, larger sorters were developed with 2, 6, 8, 12, etc., individual slides on a single frame. These individual slides were similar to the slides used on the single channel units, but economies were gained by constructing multiple slides on a single frame. These sorters presented multiple linear streams, or "strings", of product to be viewed.

If multiple channels are used, the slide is divided across its width and configured so that an approximately evenly proportioned number of dispensed products are directed to each of the channels, Such techniques of distributing to each channel the proper amount of product being dispensed onto the slide are well-known in the art. A typical slide has numerous channels that may number as high as 64 or more, although slides for many machines in service today have only a limited number of channels, like 8, and in some applications it is preferable to use a single channel.

In the early 1980's, in response to the need for higher capacity sorters and to the need to sort products which would not flow smoothly down a slide, flat belt sorters were introduced. These sorters presented a wide sheet of product to the viewer.

In the mid-1980's a type of sorter was introduced which combined the simplicity and space efficiency of the discreet channel sorter with the high throughput capability of the belt sorter. These "broad slide" sorters presented multiple flat streams of product to the viewer. The total throughput of these multiple flat streams was often equal to the throughput of competing belt sorters.

Successful sorters have been developed for cereal grains using wide, flat slides, which present a "sheet" of product to the viewer/ejector system. The purpose of the slide is to accelerate and singulate the product, and to present it uniformly into the viewing area. This is similar to the product presentation of the belt sorter. Other successful sorters have been developed using slides that are also wide and flat, but in addition, have a series of dividing ribs separating the sheet of product into a series of "ribbons" of product, one per channel. These ribbons are presented to the viewer/ejector system oriented so that each ribbon passes in front of only one ejector. This important feature eliminates the condition of a defective product or article passing through the viewer in a location that causes two adjacent ejectors to fire at the same product, which often ejects an excessive amount of acceptable product along with the unacceptable. Logically, by eliminating the condition of product flowing through the zone of more than one ejector, a slide divided into channels, as just described, results in fewer total ejector fires and the removal of less good product.

Standard gravity-fed sorting machines, by virtue of requiring conveyance to the slide, require the product be transported laterally and cast onto the slide or guide. As a result, in the standard sorting machine the product may be impelled against a solid surface, in the case of a front conveyance system or enter the slide a low downward velocity on a path to contact the guide, in the case of a rear conveyance system. In operation, the gravity-fed products to be sorted are fed from a hopper, which feeds to the slide through a dividing vibratory feeder. The vibratory feeder is integrated within the sorting machine, but is sufficiently isolated to reduce vibration of the remainder of the sorting machine. Product then passes down the slide and before the viewer/ejector system, where each product is imaged, compared to sort criteria and then allowed to pass or deflected by the ejector system. Problematically, when first activated, the volume of products induced by the vibratory feeder to the slide, and therefore before the viewer/ejection system due to lack of uniform velocity and product singulation lacks a complete set of targets for sorting. Often machine users discard these initial sort results as lacking accuracy. Likewise, after the vibratory feeder ceases or when the product supply is exhausted, products to which the vibratory feeder has already imparted motion may be carried by momentum to the slide opening after vibratory feeder shutdown. Unacceptable products within this product group may not be sorted properly as a result of lack of uniform product velocity, alignment and singulation. In a typical sorting machine configuration unacceptable product in this additional amount may not be ejected from the product flow. The effect of this unacceptable flow is sometimes referred to as the "dribble effect." As a result, unacceptable product, or contaminants, may be included in otherwise acceptable product. Finally, cessation of the vibratory feeder or exhaustion of the product supply may result in product being stranded intermediate the product supply and the slide, requiring the machine to be configured for operation to expel the unprocessed product, particularly if a different product is to be sorted.

Moreover, external vibrations may cause induce product flow, even in miniscule amounts, during times when the machine is not in operation, potentially contaminating sorted product.

Finally, the density of the product at the scan line, the point at which the sorting machine analyzes and determines whether any individual product is outside permissible parameters, drives the throughput of the sorting machine. Determination of whether the product is outside permissible parameters is accomplished by various optical equipment known in the art, such as cameras. Identification of an individual product outside of permissible parameters causes the sorter to cause an ejector to fire at the time the identified individual product will pass before the ejector. It is therefore advantageous to increase the density of the product passing through the sorting machine to the maximum density at which the optical equipment can image the passing product as this increases the throughput of the sorting machine, a desirable characteristic in the market as more product can therefore be processed.

The need therefore exists for a product control system which eliminates the lack of full through-put at start-up, eliminates the dribble effect, eliminates the potential for stranded material at shutdown, and eliminates potential contamination caused by external vibration, all while having no negative effect of through-put rate. It would be a further improvement if the product through-put were increased.

BRIEF SUMMARY OF THE INVENTION

The present invention overcomes the foregoing drawbacks of previous product control systems.

In one aspect of the present invention, the vibratory feeder, or like motion inducing devices, are replaced with a product reservoir, a high-speed control gate, and an controllable feed-rate metering gate. The high-speed control gate is located at the bottom of the product reservoir, providing for gravity-induced feed of the products when the high-speed control gate is opened. The controllable feed-rate metering gate limits the maximum feed-rate of the products after the high-speed control gate is opened. Upon opening, the maximum flow rate set by the controllable feed-rate metering gate is met immediately. Upon closing of the high-speed control gate, no further products enter the sorter.

In another aspect of the present invention, the product through-put of the sorter is increased by increasing the density of the product at singulation.

The foregoing and other objectives, features, and advantages of the invention will be more readily understood upon consideration of the following detailed description of the invention, taken in conjunction with the accompanying drawings.

BRIEF DESCRIPTION OF THE SEVERAL DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 3 is a side view of the product flow control apparatus with reference to the product reservoir and the sorting machine slide.

FIG. 4 is a front view of the product flow control apparatus with reference to the product reservoir and the sorting machine slide.

FIG. 5 is a front view of typical product to be sorted.

FIG. 6 is view of passing product in full singulation at less than full slide fill.

DETAILED DESCRIPTION OF THE INVENTION

Figure 2:
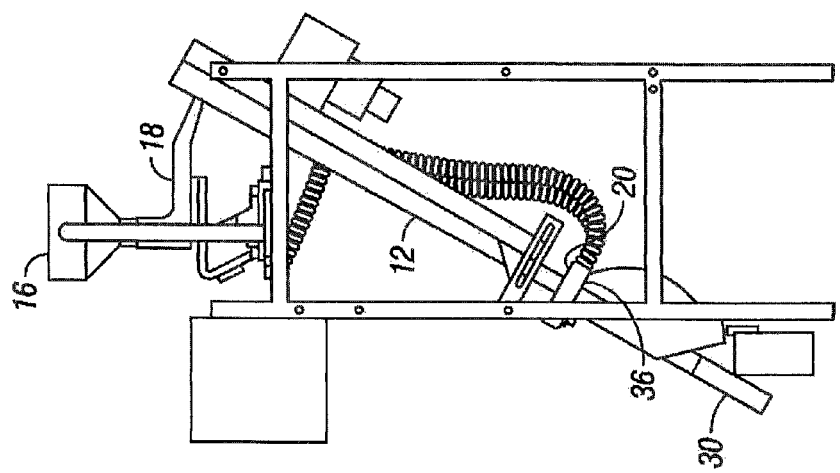
FIG. 2 is a side view of the current sorter type with which the product flow control apparatus may be used.
Figure 1:
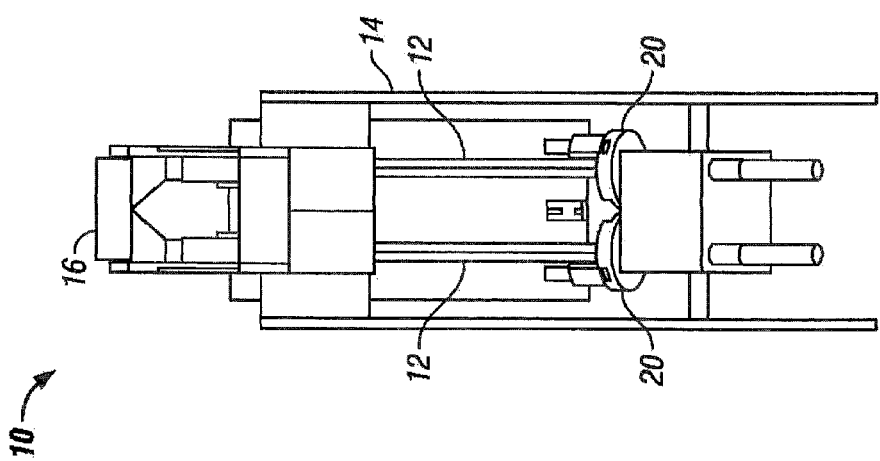
FIG. 1 is a front view of the current sorter type with which the product flow control apparatus may be used.
Figure 7:
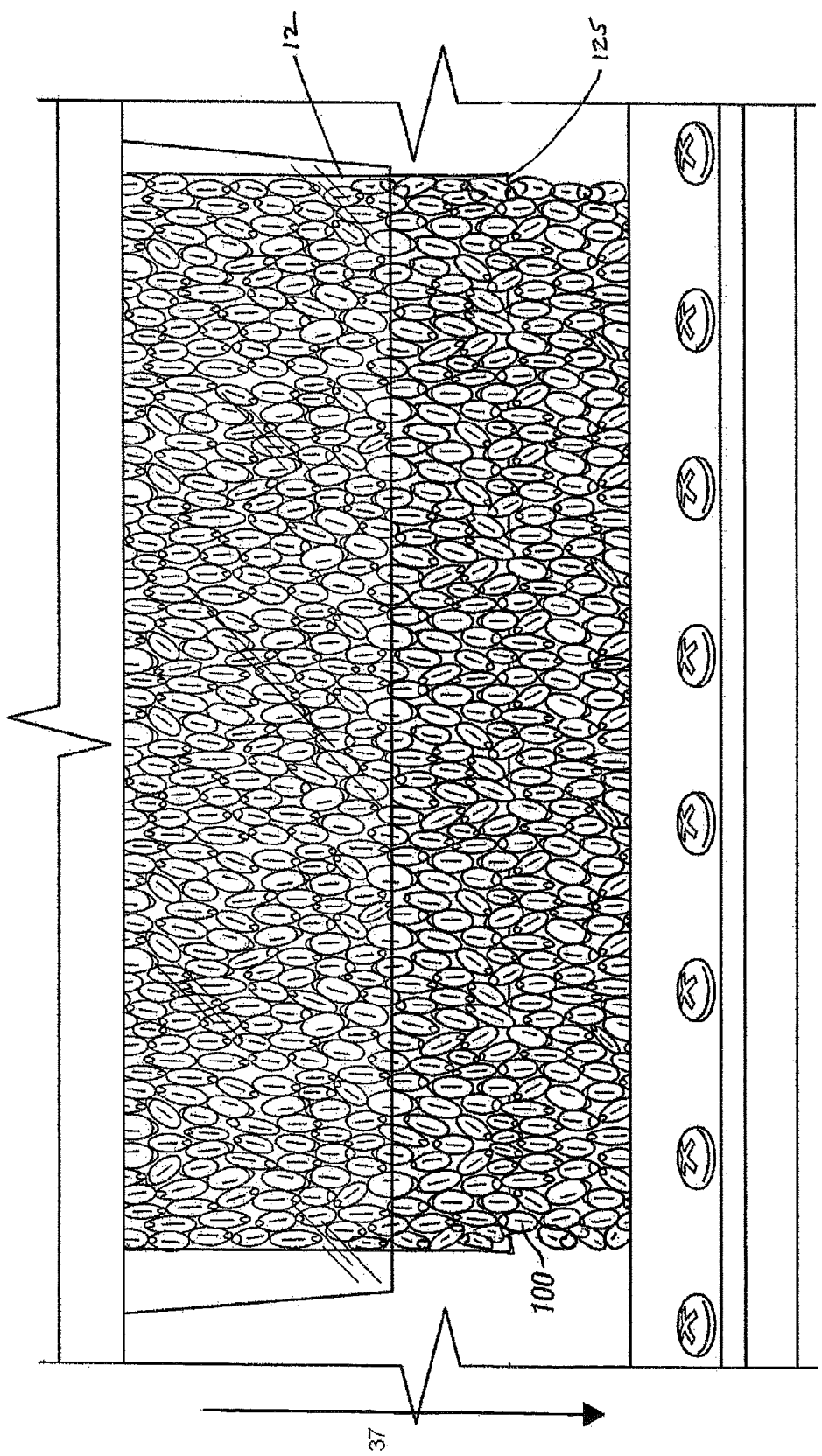
FIG. 7 is view of passing product in full singulation and at full slide fill.

Referring to the FIGS. 1 and 2, a multi-channel, high-speed sorter for separating nonstandard products from a passing stream or flow of such products is shown. This type of sorting machine is well-known. The invention disclosed herein may be used with any sorter and should not be construed as limited to the particular type of gravity-fed sorter depicted in FIGS. 1 and 2.

Generally, a typical sorting machine 10 includes one or more slides or slides 12 at a steep angle, usually over 45 degrees from the horizon and preferably nearly vertical on the order of 80 degrees. The slides are held in position by a framework 14. A hopper 16 containing products 100 (not shown in FIGS. 1 and 2) to be sorted is attached to the same framework and provides products 100 by respective feed delivery control 18 to the slide 12. The products 100 to be separated or sorted are any food or fungible material, and particularly those that are relatively small, such as almonds, peanuts, and rice grains. The size of the products 100 is product-dependant. In operation, product flow rate is less than free fall due to friction between product and slide surface. As a result product flow rate is quite high, as is well-known in the art. Machines having only a single slide and machines with many more than two slides are not uncommon. For separation or sorting the machine 10 contains at least one product viewer 20, which may be an optical sensor, to scan passing products 100. The plane at which the product viewer 20 images the passing products 100 is typically referred to as the scan line. When a product 100 to be separated from the passing flow is identified from the output of a product viewer 20, the corresponding nozzle of an ejector 36 is engaged, deflecting the selected product from the product direction of travel 37.

Referring to FIGS. 3 and 4, the product flow control apparatus 40 for use in a gravity-fed slide sorter 10 for sorting of products 100 is depicted. Like the prior art, the apparatus includes a product viewer 20 for sorting products 100 based on comparison of predetermined criteria to output from the product viewer 20. The gravity slide sorter 10 has at least one inclined chute or slide 12. In operation it would not be uncommon to have six or more slides per sorter. Positioned adjacent to each slide 12 is at least one product viewer 20 for imaging of passing products 100, typically below the slide bottom edge 125. The inclined slide 12 also has a slide tipper end 121, width 122, and length 124. It is well known in the art that regardless of the feeder used to supply the products 100 for sorting, the slide length 124 must be sufficient to obtain singulation of the products 100 before the products 100 reach the scan line 201 of the product viewer 20. Singulation is the condition at which the flow of products 100 becomes laminar, i.e., when all products are moving with the same velocity (speed and direction). Products 100 are therefore not significantly bouncing about but instead cross the scan line 201, typically after passing the inclined slide bottom edge 125, on a path parallel to the slide 12.

As depicted in FIG. 5, each of the products 100 has a cross-sectional area 101 in the plane perpendicular to the flow valve 150 and a thickness 102. The operating cross sectional area 123 of the inclined slide 12 is thereby defined by the product of the inclined slide width 122 and the product thickness 102, as measured perpendicular to the inclined slide 12.

Returning to FIGS. 3 and 4, in the preferred embodiment, the product flow control apparatus 40 includes a product reservoir 130, a flow-rate control passage 140, a flow valve 150, and a flow restrictor 160. The product reservoir 130 contains the products 100 to be sorted. In operation, the product reservoir 130 may be a hopper 16 or even piping directly from a large container of products 100.

A flow-rate control passage 140, which is vertically disposed, communicates with the product reservoir 130, so that the products 100 stored in the product reservoir 130 descend under gravity to the flow-rate control passage 140. Similarly, the flow-rate control passage 140 communicates with the inclined slide 12, so that the products 100 passing through the flow rate control passage 140 descend under gravity to the inclined slide 12. The flow control 140 has an upper orifice 141, a lower orifice 142, a first side 143, and a cross-sectional area 144. The upper orifice 141 provides the point of communication between the product reservoir 130 and the flow-rate control passage 140, while the lower orifice 142 provides the point of communication between the flow-rate control passage 140 and the slide 12.

A flow valve 150 is located intermediate the product reservoir 130 and the flow-rate control passage 140 and operates to preclude or permit the flow of products 100 to the flow-rate control passage 140 among a first flow-valve position 151 and a second flow-valve position 152. The flow valve 150 terminates communication between the product reservoir 130 and the flow-rate control passage 140 in the first flow-valve position 151, thereby precluding the flow of products 100 to the flow-rate control passage 140. The flow valve 150 permits communication between the product reservoir 130 and the flow-rate control passage 140 in the second flow-valve position 152, thereby permitting the flow of products 100 to the flow-rate control passage 140. The flow valve 150 nearly instantaneously positions between the first flow-valve position 151 and the second flow-valve position 152. Near instantaneous positioning so rapidly permits the flow of products 100 to the flow-rate control passage 140 that the maximum flow rate of products 100 from the product reservoir 130 is essentially immediately attained. Near immediate reaching of the maximum product flow rate from the product reservoir 130 is beneficial as it ensures a complete and usable sort of products at the inception of the sorting operation. This provides a complete set of targets for sorting and full throughput at start-up. Likewise, near instantaneous repositioning so rapidly precludes the flow of products 100 to the flow-rate control passage 140 that the flow rate of products 100 from the product reservoir 130 essentially immediately drops to zero. Near immediate preclusion of product flow from the product reservoir 130 is beneficial as it ensures a complete and usable sort of products throughout the flow of product 100. This provides a complete set of targets for sorting and full throughput throughout the flow of the product 100, increasing the percentage of unacceptable product being ejected from the material flow. Passing product 100 moves at full velocity and is singulated throughout the sort. There is, therefore, no "dribble effect" and, as a result, the sorted product 100 does not contain unsorted product 100. In the preferred embodiment, the flow valve 150 operates between positions precluding or permitting flow in less than one second. The flow valve 150 may be positioned by an actuator 153. The flow valve 150 may be any type of valve capable of rapid closure and rapid opening.

A flow restrictor 160 is located within or adjacent to a flow-rate control passage 140 and operable by an actuator 170 from at least one flow-restrictor position 161, which includes a first flow-restrictor position 162. In the preferred embodiment, the flow restrictor 160 is affixed within the flow-rate control passage 140 at the flow-rate control passage first side 143. The flow restrictor 160 reduces the cross-sectional area 144 of the flow-rate control passage 140 at the first flow-rate-control position 162. The cross-sectional area 144 of the flow-rate control passage 140 when the flow restrictor 160 is in the first flow-rate-control position 162 is comparable to, i.e. nearly equal but not exceeding, the operating cross sectional area 123 of the inclined slide 12.

As a result, the maximum flow rate of products 100 exiting the flow-rate control passage 140 is or approaches the maximum flow rate at which the products 100 may descend the slide 12 and reach singulation at or before the scan line 201. Thus, the products 100 are at or near maximum density for slide 12, unlike present sorting machines. This encourages sorting at maximum capacity as the product 100 is introduced to the slide 12 at the flow rate necessary to obtain full slide fill, as depicted in FIG. 6, while eliminating potential incomplete sorting targets at sort inception and termination. As the flow restrictor 160 is not adjusted to preclude flow of the products 100 at the end of operation, the flow restrictor 160 presents a downwardly-inclined face 163 to the products 100 at all times. Cessation of product being introduced to the slide 12, or shutdown of the sorting system, therefore cannot result in product 100 being stranded intermediate the product reservoir 130 and the slide 12, and thereby avoids the need to expel unprocessed material.

The combination of these devices thereby overcomes the shortcomings of the art, while permitting the maximum flow rate possible for sorting. In operation, the throughput of a sorting machine coupled to this product flow control apparatus 40 is substantially increased. In testing of wheat, the throughput of a sorting machine has been doubled. In other products, the throughput of the machine has been tripled. As a result the power requirements associated with the sorting operation are reduced. Similarly the space requirements associated with the sorting operation are reduced as a result of use of the present invention.

The terms and expressions which have been employed in the foregoing specification are used therein as terms of description and not of limitation, and there is no intention, in the use of such terms and expressions, of excluding equivalents of the features shown and described or portions thereof.

We claim:

1. A feed control apparatus for use in a gravity slide sorter for sorting of products;
   each of said products having thickness;
   said gravity slide sorter having a product viewer, said product viewer defining a scan line;
   said gravity slide sorter sorting products based on comparison of pre-determined criteria to output from said product viewer;
   said gravity slide sorter having at least one inclined slide;
      said inclined slide having a slide upper end;

said inclined slide having width;
said product viewer positioned adjacent said at least one inclined slide;
said inclined slide having an operating cross sectional area, said operating cross sectional area being the product of said inclined slide width and said product thickness;
said inclined slide having a length and incline sufficient to obtain singulation of said products before said products reach said scan line;

comprising:

a product reservoir;
said product reservoir containing said products to be sorted;

a flow-rate control passage;
said flow-rate control passage having an upper orifice, a lower orifice, a first side, and a cross-sectional area;
said flow-rate control passage upper orifice being in communication with said product reservoir;
said flow-rate control passage lower orifice being in communication with said at least one inclined slide;
said flow-rate control passage being vertically disposed;

a flow valve;
said flow valve intermediate said product reservoir and said flow-rate control passage;
said flow valve operable among a first flow-valve position and a second flow-valve position;
said flow valve terminating communication between said product reservoir and said flow-rate control passage in said first flow-valve position;
said flow valve permitting communication between said product reservoir and said flow-rate control passage in said second flow-valve position;
said flow valve near-instantaneously repositioned between a first flow-valve position and a second flow-valve position;

a flow restrictor;
said flow restrictor operable among at least one flow-restrictor position,
said at least one flow-restrictor position including a first flow-restrictor position;
said flow restrictor reducing said cross-sectional area of said flow-rate control passage at said first flow-rate-control position;
said cross-sectional area of said flow-rate control passage at said first flow-rate-control position comparable to said operating cross sectional area of said inclined slide;
said flow restrictor presenting a downwardly-inclined face to said products at all times.

2. The feed control apparatus of claim 1 further comprising:
(a) a flow-restrictor actuator, said flow-rate control actuator positioning said flow restrictor.

3. A feed control apparatus for use with a gravity slide sorter for sorting of products, each of said products having thickness;

comprising:
a product supply;
a vertically disposed flow-rate control passage in communication with said product supply and in communication with said gravity slide sorter, said flow-rate control passage having a first side and an internal cross-sectional area;
a flow valve intermediate said product supply and said flow-rate control passage, said flow valve near-instantaneously repositionable among a closed flow-valve position and an open flow-valve position;
a flow restrictor positioned in said flow-rate control passage and operable among a plurality of flow-restrictor positions to alter said cross-sectional area of said flow-rate control passage at said first flow-rate-control position.

* * * * *